US009376786B2

(12) United States Patent
Numasawa

(10) Patent No.: US 9,376,786 B2
(45) Date of Patent: Jun. 28, 2016

(54) CONSTRUCTION MACHINE

(75) Inventor: Masaru Numasawa, Hiroshima (JP)

(73) Assignee: KOBELCO CONSTRUCTION MACHINERY CO., LTD., Hiroshima-shi (JP)

( * ) Notice: Subject to any disclaimer, the term of this patent is extended or adjusted under 35 U.S.C. 154(b) by 194 days.

(21) Appl. No.: 14/239,054

(22) PCT Filed: Aug. 7, 2012

(86) PCT No.: PCT/JP2012/005013
§ 371 (c)(1),
(2), (4) Date: Feb. 14, 2014

(87) PCT Pub. No.: WO2013/027351
PCT Pub. Date: Feb. 28, 2013

(65) Prior Publication Data
US 2014/0166380 A1    Jun. 19, 2014

(30) Foreign Application Priority Data
Aug. 19, 2011    (JP) .................. 2011-179689

(51) Int. Cl.
*F01P 1/02*    (2006.01)
*E02F 9/08*    (2006.01)
(Continued)

(52) U.S. Cl.
CPC .............. *E02F 9/0866* (2013.01); *B60K 11/06* (2013.01); *F01P 1/02* (2013.01); *F01P 5/06* (2013.01); *B60Y 2200/412* (2013.01); *F01P 2001/005* (2013.01)

(58) Field of Classification Search
CPC ............. E02F 9/0866; F01P 1/02; F01P 5/06; F01P 2001/005; B60K 11/06; B62D 25/08; B60Y 2200/412
See application file for complete search history.

(56) References Cited

U.S. PATENT DOCUMENTS 1,655,518 A * 1/1928 Smith ....................... F01P 1/02
123/41.33
2001/0007292 A1 7/2001 Yabf
(Continued)

FOREIGN PATENT DOCUMENTS

EP    0649978 A1 *    4/1995 ............. B60K 11/02
EP    1 628 000 A1    2/2006
(Continued)

OTHER PUBLICATIONS

Extended European Search Report issued Feb. 16, 2015 in Patent Application No. 12825313.5.
(Continued)

*Primary Examiner* — John Walters
*Assistant Examiner* — Hilary L Johns
(74) *Attorney, Agent, or Firm* — Oblon, McClelland, Maier & Neustadt, L.L.P.

(57) ABSTRACT

In a construction machine having an engine room and capable of efficiently collecting air flowing in the engine room, a heat exchanger provided at a first side of the engine, and a fan provided at the first side and rotating to generate around the engine a flow of cooling air, further includes an exhaust duct extending in a fan axial direction parallel with a rotation axis of the fan along the engine. The exhaust duct guides the flow of the air to collect the air flowing downstream of the fan in the fan axial direction, in a region extending in the fan axial direction, and discharges the air to an outside of the engine room.

8 Claims, 5 Drawing Sheets

(51) Int. Cl.
*F01P 5/06* (2006.01)
*B60K 11/06* (2006.01)
*F01P 1/00* (2006.01)

(56) References Cited

U.S. PATENT DOCUMENTS

| | | | |
|---|---|---|---|
| 2005/0188926 A1* | 9/2005 | Kimura | B60R 13/0838 123/41.7 |
| 2008/0178825 A1* | 7/2008 | Mitchell | F01P 1/06 123/41.56 |
| 2008/0223319 A1* | 9/2008 | Nakashima | E02F 9/0866 123/41.66 |

FOREIGN PATENT DOCUMENTS

| | | | |
|---|---|---|---|
| EP | 1 628 001 A1 | 2/2006 | |
| GB | 2 358 165 A | 7/2001 | |
| JP | 4-76930 U | 7/1992 | |
| JP | DE 4243593 A1 * | 7/1993 | F01P 3/18 |
| JP | 7 158111 | 6/1995 | |
| JP | 2548492 | 9/1997 | |
| JP | 2005 36447 | 2/2005 | |
| JP | 2005 145114 | 6/2005 | |

OTHER PUBLICATIONS

International Search Report Issued Oct. 23, 2012 in PCT/JP12/005013 Filed Aug. 7, 2012.

* cited by examiner

CONSTRUCTION MACHINE

TECHNICAL FIELD

The present invention relates to a construction machine, such as an excavator, the construction machine including a heat exchanger and a device for cooling the heat exchanger.

BACKGROUND ART

A background art of the present invention will be described by taking an excavator shown in FIG. 9 as an example.

The excavator includes a lower traveling body 1, an upper swirling body 2 mounted pivotally thereon and having an upper frame 3 as a base, various facilities and equipment including a cabin 4 mounted on the upper frame 3, a working attachment (or a excavation attachment) 5 attached to a front part of the upper frame 3, and a counterweight 6 attached to a rear end part of the upper frame 3. The cabin 4 is provided at a left-side front part in a traveling direction of the upper frame 3. An engine room 8 which houses the engine 7 is provided at a rear part of the upper frame 3.

FIG. 10 is a schematic cross-sectional view of arrangement of equipment and a flow of air in the engine room 8, as viewed from a rear side. The engine room 8 includes a long space in a left and right direction surrounded by a bottom plate 9 that is a part of the upper frame 3 and configures a floor of the engine room 8 and an engine guard member 10 which is formed of a panel material. The counterweight 6 is also a part of the engine guard member 10.

The engine 7 is installed in the engine room 8 in a posture extending in a left and right direction. At one side (a right side in the illustrated example) of right and left sides of the engine 7, a heat exchanger 11 including a radiator and an oil cooler for cooling the engine 7 and a fan 12 of an axial flow type are provided. An intake port 13 is provided on a right side portion of an upper wall of the engine room 8, and an exhaust port 16 is provided on a left side portion thereof. The fan 12 is rotated to draw in outside-air through the intake port 13, causing the air to pass through the heat exchanger 11, thereby cooling the heat exchanger 11.

At the other side (the left side in the illustrated example) of the left and right sides of the engine 7, a hydraulic pump 14 and a pump cover 15 positioned over the hydraulic pump 14 are provided. The pump cover 15 covers at least a part of the hydraulic pump 14 so as to prevent oil leaked and scattered in a mist shape from the hydraulic pump 14 from falling on the engine 7, specifically, on an exhaust system including a muffler not shown.

The rotation of the fan 12 forms a flow of air as indicated by arrowheads in FIG. 10 on a downstream side of the fan 12. The flow of air includes respective direction components in a rotational direction and a centrifugal direction of the fan 12, and the air moves from right to left in a long distance over substantially a whole region on the downstream side of the fan 12, and reaches the exhaust port 16 at a left end. The flow of air is therefore susceptible to large resistance and likely to form turbulence. This involves a decrease in exhaust efficiency.

As a technique for solving this problem, Patent Documents 1 and 2 disclose providing a groove, that is, a concave path, vertically extending to a portion behind a fan in front of the counterweight 6 forming a rear surface of the engine room 8, and directly collecting air blown out from the fan 12 to directions including a swirling direction and a radial direction of the fan 12, through the groove, and discharging the air outside the engine room; however, this technique does not actually improve exhaust efficiency of the air for the following reason. The air flowing as described above actually moves while swirling a whole region of a fan downstream side due to the component in a fan axial direction as described above. On the other hand, according to the prior art described in Patent Documents 1 and 2 above, only the air blown out from the fan 12 to the radial direction and the swirling direction is captured and discharged; air having passed through a majority of a region at the fan downstream side, therefore, cannot be collected. Furthermore, there is great airflow resistance in the inlet portion of the groove, which degrades air volume performance.

In the prior-art technique, it is possible to widen an air capturing range in the fan axial direction by increasing a groove width, in order to increase the air volume performance; however, the expansion of the groove width must be significantly constrained because the expansion thereof degrades the original function of the counterweight.

Patent Document 1: Japanese Patent Application Publication No. 2005-36447

Patent Document 2: Japanese Patent Application Publication No. 2005-145114

SUMMARY OF THE INVENTION

An object of the present invention is to provide a construction machine having an engine room, the control machine being capable of efficiently collecting air flowing in the engine room and improving exhaust efficiency. The construction machine includes: an engine room; an engine housed in the engine room; a heat exchanger provided at a first side as one side in a longitudinal direction of the engine; a fan of an axial-flow type provided at the first side of the engine and adapted to be rotated to generate, around the engine, a flow of cooling air which enters the engine room from an outside of the engine room and passes through the heat exchanger, the flow containing respective direction components in a rotational direction, a centrifugal direction, and an axial direction, of the fan; and an exhaust duct having an air inlet opening and an air outlet opening and provided in the engine room so as to extend in a fan axial direction parallel with a rotation axis of the fan along the engine, the exhaust duct adapted to guide the flow of the air so as to collect the air, which flows at a downstream side of the fan in the fan axial direction, in a region extending in the fan axial direction and so as to discharge the air to an outside of the engine room.

BEST MODE FOR CARRYING OUT THE INVENTION

Figure 1:
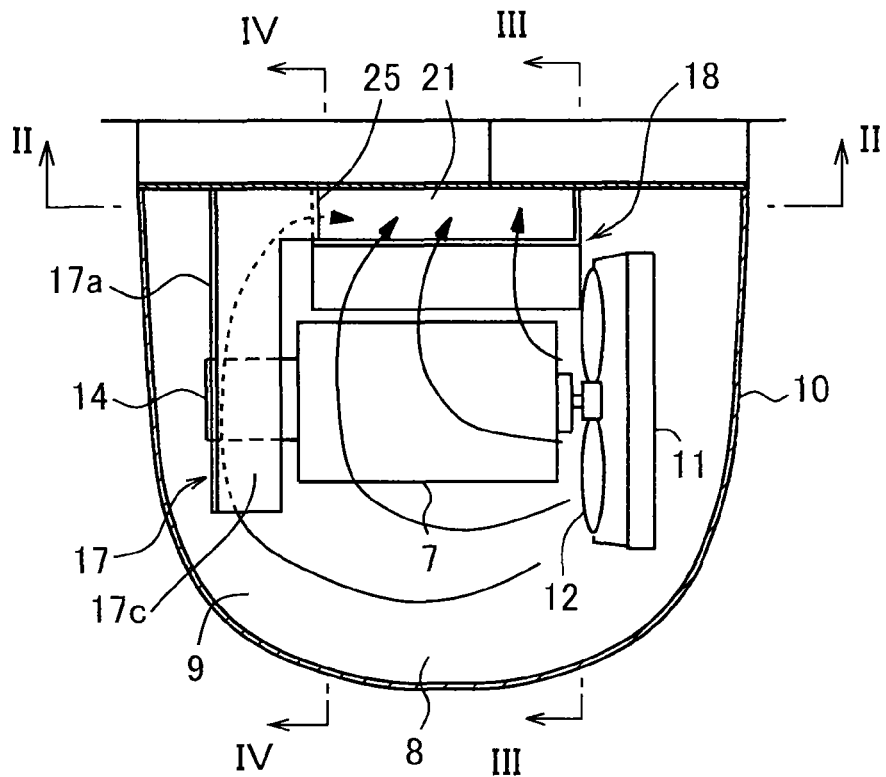
FIG. 1 is a schematic cross-sectional plan view of a rear part of an excavator according to a first embodiment of the present invention.

Embodiments of the present invention are described with reference to FIGS. 1 to 8. These embodiments are applications of the present invention to the excavator shown in FIG. 9. Thus, the excavator according to the embodiments includes: the lower traveling body 1; the upper swirling body 2 mounted thereon so as to be slewable and including the upper frame 3 as a base; various facilities and equipment including the cabin 4 mounted on the upper frame 3; the working attachment (or the excavating attachment) 5 attached to the front part of the upper frame 3, and the counterweight 6 attached to the rear end part of the upper frame 3. The cabin 4 is provided at the left-side front part in the traveling direction of the upper frame 3. An engine room 8 for housing the engine 7 is provided at the rear part of the upper frame 3. The engine room 8 includes a long space in the right and left direction surrounded by a bottom plate 9 configuring the floor and an engine guard member 10 formed of a panel material. The counterweight 6 also forms a part of the engine guard member 10.

The engine 7 is installed in the engine room 8 in a posture extending in the left and right direction. At one side (the right side in the illustrated example) of the left and right direction of the engine 7, a heat exchanger 11 and a fan 12 of an axial flow type are provided, the heat exchanger 11 including a radiator and an oil cooler for cooling the engine 7. The engine room 8 is provided with an intake port 13 on the right side portion of the upper wall of the engine room 8. The fan 12 is adapted to be rotated to draw in outside-air through the intake port 13 and cause the air to pass through the heat exchanger 11, thereby cooling the heat exchanger 11.

At the other side (the left side in the illustrated example) of the right and left sides of the engine 7, provided are a hydraulic pump 14 and a pump cover 17 positioned over the hydraulic pump 14. The pump cover 17 partitions between the engine 7 and the hydraulic pump 14 to prevent oil leaked and scattered in a mist shape from the hydraulic pump 14 from falling on the engine 7, specifically, on an exhaust system including a muffler not shown.

The rotation of the fan 12 forms a flow of air as indicated by arrowheads in FIGS. 1 to 4 and FIG. 7 at a downstream side of the fan 12. The flow of air includes respective direction components in a rotational direction, a centrifugal direction and an axial component, of the fan 12.

Next are described details of a first embodiment of the present invention with reference to FIGS. 1 to 6.

The excavator according to the first embodiment includes an exhaust duct 18 in addition to the above configuration elements. The exhaust duct 18 is provided at a front lower part of the engine 7 in the engine room 8, in a posture extending in a fan axial direction (a right and left direction of the excavator) along the engine 7. The exhaust duct 18 is composed of a duct body 19 and a partition plate 20 which is located in front of the engine 7. The partition plate 20 is one of partition members that partition a space above the upper frame 3 into front and rear portions to thereby define the engine room 8 at a rear part of the upper frame 3. The partition plate 20 is provided to stand up on the bottom plate 9 at a position in front of the engine 7, extending in a right and left direction over substantially a whole region in the left and right direction of the bottom plate 9.

Figure 5:
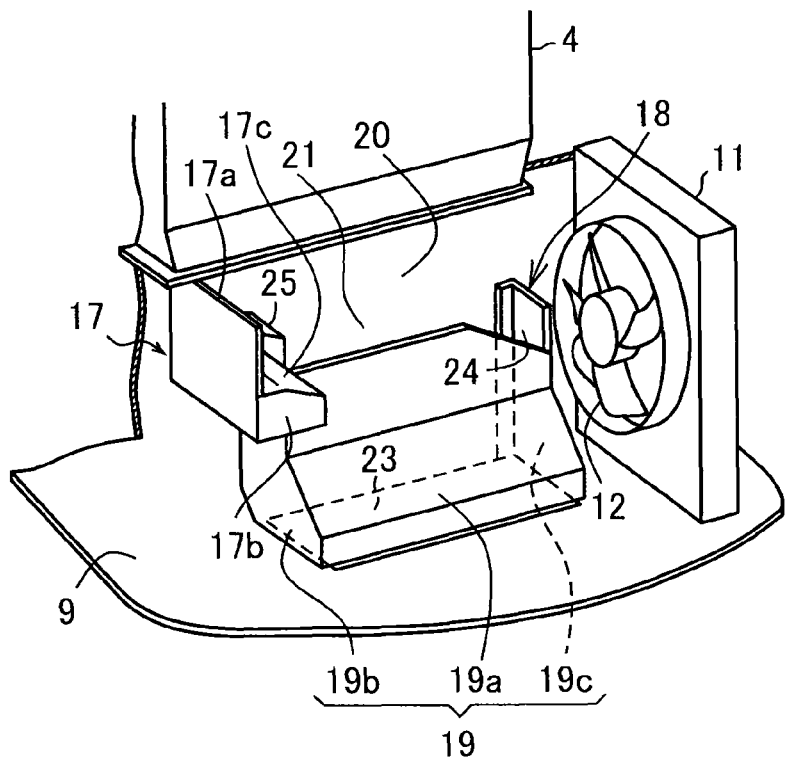
FIG. 5 is a perspective view of the rear part of the excavator according to the first embodiment.

As shown in FIG. 5, the duct body 19 integrally has a front sidewall 19a positioned in front of the partition plate 20 with a distance from the partition plate 20, and left and right sidewalls 19b and 19c extending backward from both left and right ends of the front sidewall 19a. The sidewalls 19a to 19c form a frame body long in the right and left direction and surrounding an interior space opened to a front side and both upper and lower sides. The duct body 19 is attached to a rear surface of the partition plate 20 on the bottom plate 9 to thereby form the exhaust duct 18 having an air inlet opening 21 and an air outlet opening 22 each extending in a right and left direction, at upper and lower ends, respectively.

Figure 6:
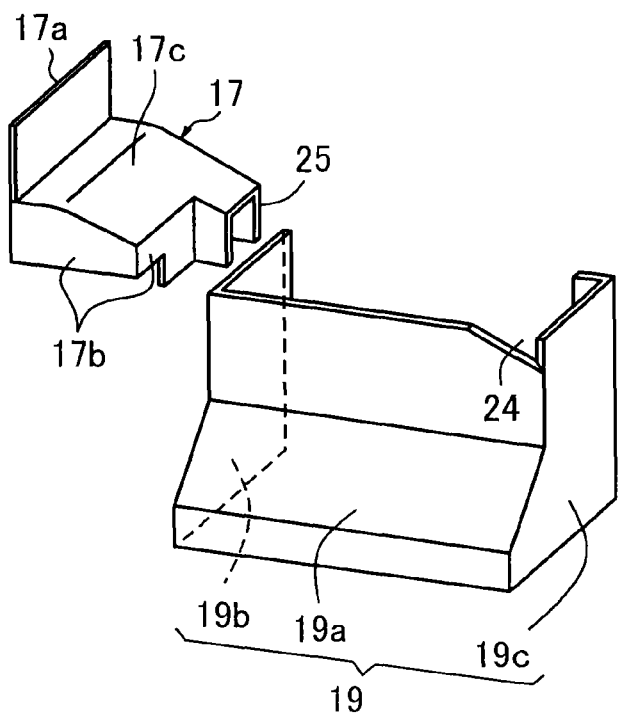
FIG. 6 is a perspective view of an exhaust duct and a pump cover according to the first embodiment.

The bottom plate 9 is provided with an exhaust port 23 opened below the engine room 8 at a position corresponding to the air outlet opening 22 of the exhaust duct 18. The exhaust duct 18 is thus allowed to draw in an air moving around the engine 7 into the exhaust duct 18 through the air inlet opening 21 at an upper end of the exhaust duct 18 and discharge the air through the air outlet opening 22 at a lower end and the exhaust port 23 below the air outlet opening 22. As shown in FIGS. 5 and 6, a notch 24 is formed at a right upper end part of the front sidewall 19a of the duct body 19, that is, at a portion located at a most upstream side of the flow of air as a portion located in front of the fan 12. The notch 24 facilitates introduction of the air flowing having respective direction components in the rotational and centrifugal directions of the fan 12, into the exhaust duct 18.

Figure 3:
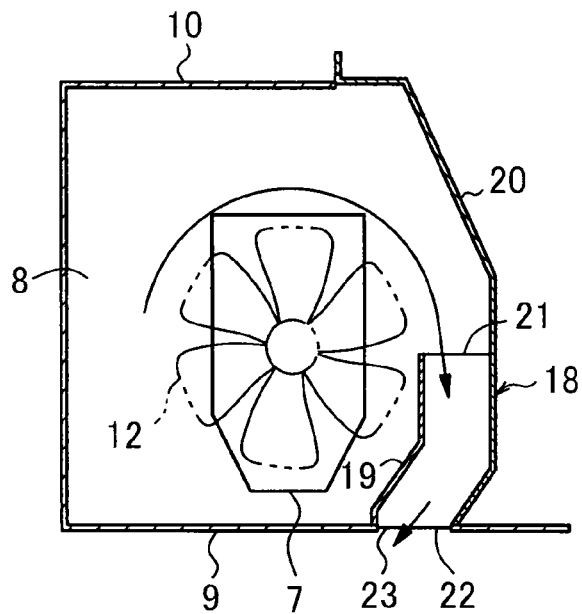
FIG. 3 is a cross-sectional view of the rear part of the excavator in FIG. 1 along a line III-III.
Figure 4:
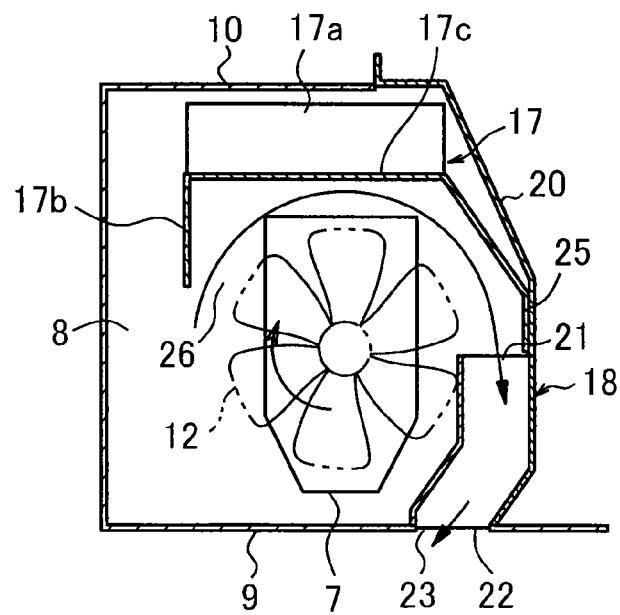
FIG. 4 is a cross-sectional view of the rear part of the excavator in FIG. 1 along a line IV-IV.

As shown in FIGS. 3 and 4, the exhaust duct 18 according to the first embodiment has a shape of being bent at a vertically intermediate position so as to direct a lower half part of the exhaust duct 18 obliquely backward, that is, a shape substantially along a swirling direction of the air around the fan 12.

The exhaust duct 18 may include a sound-absorption member, such as glass wool, which is fixed to an inner surface of the sidewall configuring the exhaust duct 18.

The exhaust duct 18 is preferably provided over substantially a whole length of the engine 7 as shown in the drawings or a larger range so as to be able to collect the air flowing around the engine 7 over a large possible range in the fan axial direction as long as possible. The present invention, however, does not exclude an embodiment where the exhaust duct 18 is shorter than the whole length of the engine 7 for the reason of a relationship with a layout of other devices and other reasons. The phrase of "the exhaust duct collects air that flows at a downstream side of the fan in the fan axial direction, in a region extending in the fan axial direction" in the present invention refers to not only collecting the air blown out from the fan 12 to the swirling direction and the radial direction as described in the prior art, but also collecting the air moving to a downstream side of the fan 12 in the fan axial direction, in a permissible maximum large range including a region extending in the fan axial direction, preferably the whole length of the engine 7 or a region near the whole length.

On the other hand, the pump cover 17 has a shape that fulfills an air guide function of guiding the air flowing around the engine 7, to the exhaust duct 18 at a most downstream side of the air, in addition to the original function, that is, the function of covering at least a part of the hydraulic pump 14 (covering from above in the example shown in FIGS. 1 and 2) to prevent a leakage or splashing oil from the hydraulic pump 14 from reaching the engine 7.

Specifically, the pump cover 17 integrally includes a body wall 17c for covering the hydraulic pump 14 at a side of the engine 7 from above, and a sidewall 17b extending downward from a peripheral edge of the body wall 17c. The body wall 17c and the sidewall 17b cover the hydraulic pump 14 thereabove, and configure an air guide member surrounding a space opened below, that is, the air guide member which forms a lower opening 26, as shown in FIG. 4. Moreover, the air guide member configured by the body wall 17c and the sidewall 17b has a guide part 25 extended in the fan axial direction toward the air inlet opening 21 of the exhaust duct 18, at a front end part of the air guide member, that is, at a portion positioned in front of the engine 7. The air guide member configured by the pump cover 17, therefore, has a shape capable of allowing the air swirling around the engine 7 to be blown through a rear part of the lower opening 26 as an air inlet and to be discharged through an air outlet as an opening at an end part of the guide part 25 to the air inlet opening 21 of the exhaust duct 18.

Figure 2:
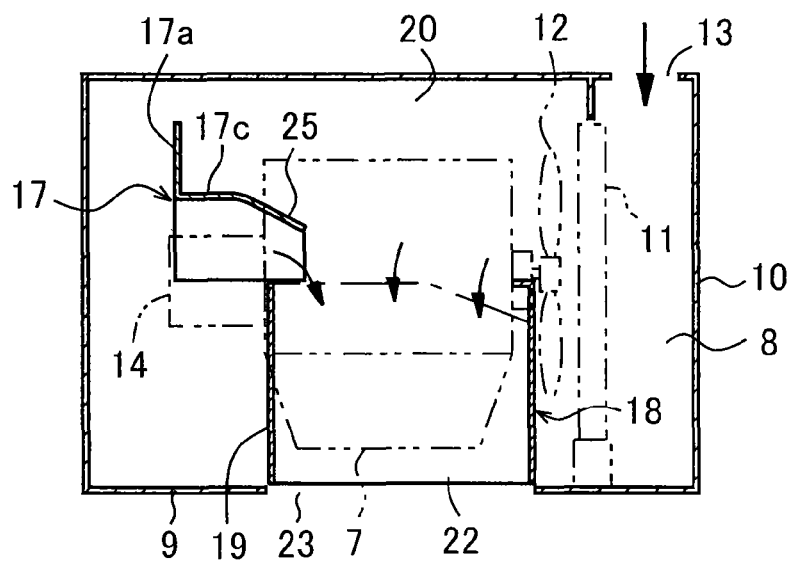
FIG. 2 is a cross-sectional view of the rear part of the excavator in FIG. 1 along a line II-II.

The guide part 25 may be arranged to cover a left side end part of the air inlet opening 21 from above as shown in FIG. 2, or may be arranged to be positioned at a slightly left side of the left side end part of the air inlet opening 21. Although the pump cover 17 shown in FIGS. 1 to 6 has an upper sidewall 17a extending upward from an outer side edge part of the body wall 17c of the pump cover 17, the upper sidewall 17a can be suitably omitted.

The excavator according to the present embodiment, including the exhaust duct 18, can have an improved exhaust efficiency. Specifically, the exhaust duct 18 is capable of collecting the air moving in the fan axial direction while swirling by the rotation of the fan 12 over a specific region (a region over the whole length of the engine in the present embodiment) extending in a moving direction of the air and discharging it. Furthermore, the air inlet opening 21 of the exhaust duct 18, provided over substantially the whole length of the exhaust duct 18, makes airflow resistance in the air inlet portion be small. This allows the exhaust efficiency be significantly improved, compared to the exhaust duct which can collect only the air blown out in the swirling direction and the radial direction from the fan 12 as described in the prior art.

Furthermore, according to the present embodiment, the following effects can be obtained.

(i) The exhaust duct 18, disposed in front of the lower part of the engine 7 so as to draw in the air flowing around the engine 7 from above and discharge the air from below, can smoothly draw in and discharge the air with small airflow resistance. This allows exhaust efficiency to be further improved.

(ii) The exhaust duct 18, adapted to discharge the collected air downward of the exhaust duct 18, can suppress influence of machine noise leaked out from the inside of the engine room 8 to an outside, for example, noise generated by the engine 7 and the hydraulic pump 14, to the surrounding.

(iii) The exhaust duct 18, configured by utilization of the partition plate 20 which is a part of the engine guard, can have a small number of parts and can be assembled by a small number of steps, thus involving low cost.

(iv) The pump cover 17, functioning as an air guide member for guiding air having passed through a fan-axial region of the provided exhaust duct 18 to the exhaust duct 18 at a downstream side of the exhaust duct 18, contributes to an improved exhaust efficiency in cooperation with suppressing generation of a turbulent flow due to leakage air. Furthermore, combined use of the pump cover 17 for the air guide member allows the air guide member to be installed, without difficulty, in the engine room 8, limited space, in addition to avoidance of increase in the number of parts.

(v) The exhaust duct 18, having a shape of being bent to a front and rear direction when viewed at a side wherein a vertical intermediate part of the exhaust duct 18 swells to the front beyond the upper and lower ends, that is, a shape of being along a direction in which air swirls around the fan 12, makes it possible: to enhance reflection and attenuation effects of sound in the exhaust duct 18; to enhance a noise reduction effect by suppressing "direct sound" that is directly leaked out through the exhaust duct 18; and to enhance exhaust efficiency by bettering the flow of air in the exhaust duct 18.

Figure 7:
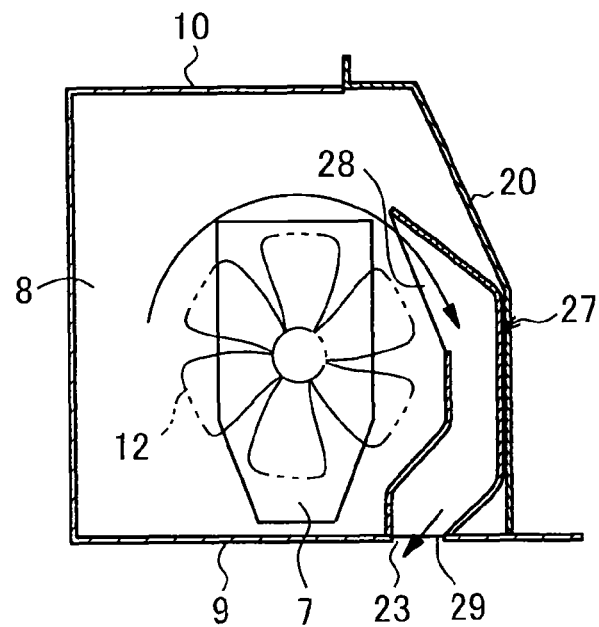
FIG. 7 is a schematic cross-sectional side view according to a second embodiment of the present invention, corresponding to FIG. 3.
Figure 8:
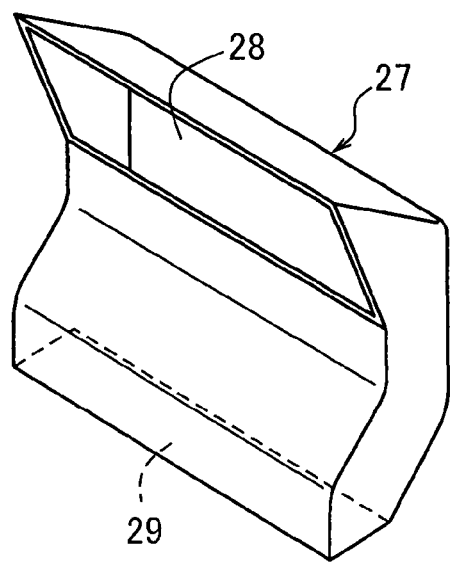
FIG. 8 is an outline perspective view of an exhaust duct according to the second embodiment.
Figure 9:
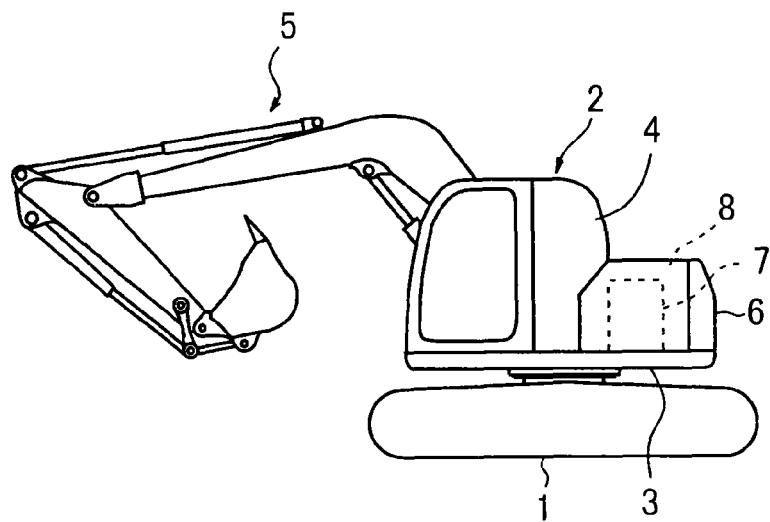
FIG. 9 is a side view of an example of an excavator to which the present invention is applied.
Figure 10:
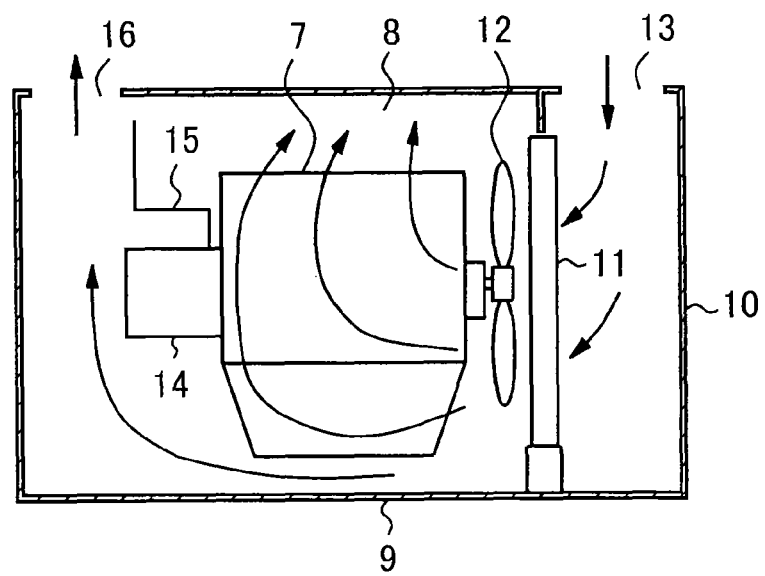
FIG. 10 is a rear-surface cross-section view of a conventional cooling device corresponding to FIG. 2.

A second embodiment of the present invention will be described with reference to FIGS. 7 and 8. The second embodiment, while being based on the excavator according to the first embodiment, includes an exhaust duct 27 in place of the exhaust duct 18. Differently from the exhaust duct 18, the exhaust duct 27 is configured as an independent housing that encloses an interior space, which is long in right and left direction, by only the exhaust duct 27 itself, while, similar to the exhaust duct 18, the exhaust duct 27 is installed in a posture extending in a right and left direction in front of the engine 7 in the engine room 8. The exhaust duct 27 has a shape that is bent in a front and rear direction at vertically arranged two positions so that upper and lower part of the exhaust duct 27 direct obliquely backward, that is, so that a vertically intermediate part thereof swells to the front as compared with the upper and lower ends. Thus, the exhaust duct 27 has a shape of more fitting the swirling direction of air around the fan 12. The exhaust duct 27 also has an air inlet opening 28 and an air outlet opening 29, and the air outlet opening 29 is provided at a lower end of the exhaust duct 27 similarly to the air outlet opening 22 in the first embodiment, while the air inlet opening 28 is opened backward at an upper part of the exhaust duct 27. Besides, the exhaust duct 27 has a larger height than that of the exhaust duct 18 in the first embodiment, and the air inlet opening 28 is adjacent to an upper part of the engine 7.

The exhaust duct 27 further has the following effects, in addition to the effects of the exhaust duct 18 according to the first embodiment. First, the exhaust duct 27, which surrounds the interior space by itself, has a high degree of freedom in an arrangement position thereof, being allowed to be disposed at an optimum position in accordance with a size of the engine room 8 and a device layout. Second, the exhaust duct 18, adapted to receive the flow of air around the engine 7 at a higher position than a position of the exhaust duct 18 according to the first embodiment, can collect the air more smoothly and without leakage. Third, the exhaust duct 18, having a shape of being bent at vertically arranged two positions (or may be at more positions), can more effectively suppress leakage of machine noise to an outside.

The present invention is not limited to the first and second embodiments. The present invention also includes the following modes, for example.

(1) An exhaust duct may be arranged behind the engine, when there is no limitation of a space or device layout in the engine room.

(2) In the present invention, an exclusive air guide member configured separately from the pump cover may be arranged at a downstream side of the engine in the fan axial direction.

(3) The present invention can be applied not only to the excavator, but can be also widely applied to a crusher, a demolition machine, and the like configured by use of a matrix of the excavator, for example.

An object of the present invention is to provide a construction machine having an engine room, the control machine being capable of efficiently collecting air flowing in the engine room and improving exhaust efficiency. The construction machine includes: an engine room; an engine housed in the engine room; a heat exchanger provided at a first side as one side in a longitudinal direction of the engine; a fan of an axial-flow type provided at the first side of the engine and adapted to be rotated to generate, around the engine, a flow of cooling air which enters the engine room from an outside of the engine room and passes through the heat exchanger, the flow containing respective direction components in a rotational direction, a centrifugal direction, and an axial direction, of the fan; and an exhaust duct having an air inlet opening and an air outlet opening and provided in the engine room so as to extend in a fan axial direction parallel with a rotation axis of the fan along the engine, the exhaust duct adapted to guide the flow of the air so as to collect the air, which flows at a downstream side of the fan in the fan axial direction, in a region extending in the fan axial direction and so as to discharge the air to an outside of the engine room.

According to the construction machine, air that moves to the fan axial direction while swirling by the rotation of the fan is collected in a region whose range in the fan axial direction which is a movement direction of the air is limited. Besides, no requirement for a groove for the collection differently from the prior art allows airflow resistance at the inlet portion of the air allows not to be large. These enable exhaust efficiency to be substantially improved as compared with the prior art that enables only collection of air blown out in the swirling direction and the radial direction from the fan.

Preferably, the exhaust duct is provided over substantially a whole region of the engine in the fan axial direction, and the air inlet opening and the air outlet opening are formed over substantially a whole length of the exhaust duct in the fan axial direction. This exhaust duct can collect and discharge an airflow which moves to the fan axial direction while swirling around the engine at a downstream side of the fan, having particularly good exhaust efficiency.

The exhaust duct preferably has the air inlet opening at an upper part thereof and has the air outlet opening at a lower part thereof, being disposed in front of or behind a lower part of the engine so as to suction the air flowing around the engine from above and discharge the air from below. The exhaust duct enables the air around the engine to be drawn in, from above the exhaust duct, by matching a swirling direction of the air, and discharged from below, thereby allowing the air to be smoothly drawn in and discharged with small airflow resistance to thereby allow exhaust efficiency to be further improved. Besides, the exhaust duct, adapted to discharge the air from a lower part of the exhaust duct, can suppress influence of machine noise leaked out from the inside of the engine room to an outside, for example, noise generated by the engine and the hydraulic pump, to the surrounding.

Further, according the present invention, in the case of the construction machine comprising a frame including a part which configures a floor of the engine room and a partition member which stands up in a posture of extending substantially in parallel with a longitudinal direction of the engine on the frame to define the engine room at a rear part of the frame, it is preferable that the construction machine further comprises a duct body in a frame shape surrounding a space opened to the front, the duct body being attached to a rear-side surface of the partition member to form the exhaust duct in cooperation with the partition member. The combination of the partition member and the duct body allows the exhaust duct to be formed at low cost by a small number of parts and a small number of assembly processes by utilization of the partition member which is a part of the engine guard constituting the engine room.

Besides, the construction machine according to the present invention, preferably, further includes an air guide member adapted to collect air having passed in the fan axial direction a region in which the exhaust duct collects the air, at a downstream side of the region, and guide the air to the exhaust duct. The air guide member, collecting the air temporarily passing through a collection region of the exhaust duct at a downstream side of the collection region and guiding the collected air to the exhaust duct, can contribute to improved exhaust efficiency in cooperation with suppressing generation of a turbulent flow due to leakage air.

In the case of the construction machine which includes a hydraulic pump provided at a second side of the engine opposite to the first side and a pump cover covering the hydraulic pump to shield at least a part of the hydraulic pump from the engine, it is preferable that the pump cover has an air inlet for taking in air flowing around the engine and an air exit for discharging the taken-in air into the exhaust duct to function as the air guide member. This combined use of the pump cover for the air guide member allows the air guide member to be installed without difficulty in the engine room whose space is limited while suppressing increase in the number of parts.

More specifically, the pump cover preferably has a shape having an opening at a lower end and covering the hydraulic pump at an upper side thereof to discharge air having flowed in through the opening to the exhaust duct.

The exhaust duct preferably has a shape that is bent between the air inlet opening and the air outlet opening. The bending of the exhaust duct makes it possible to enhance reflection and attenuation effects of sound in the exhaust duct and enhance a noise reduction effect by suppressing "direct sound" that is directly leaked out through the exhaust duct.

In this case, it is preferable that the exhaust duct is bent along a direction in which air swirls around the fan. This shape of the exhaust duct makes the flow of air in the duct smooth to thereby enable exhaust efficiency to be further enhanced.

The invention claimed is:
1. A construction machine comprising:
   an engine room;
   an engine housed in the engine room;
   a heat exchanger provided at a first side as one side in a longitudinal direction of the engine;
   an axial-flow fan provided at the first side of the engine and adapted to be rotated to generate, around the engine, a flow of cooling air which enters the engine room from an outside of the engine room and passes through the heat exchanger, the flow containing respective direction components in a rotational direction, a centrifugal direction, and an axial direction, of the fan; and
   an exhaust duct having an air inlet opening and an air outlet opening and provided in the engine room so as to extend in a fan axial direction parallel with a rotation axis of the fan along the engine, the exhaust duct adapted to guide the flow of the air so as to collect the air, which flows at a downstream side of the fan in the fan axial direction, in a region extending in the fan axial direction and so as to discharge the air to an outside of the engine room,
   wherein the exhaust duct has the air inlet opening at an upper part thereof, the air inlet opening located at a position higher than a bottom of the engine, and has the air outlet opening at a lower part thereof at a position lower than the air inlet opening, the exhaust duct being disposed in front of or behind a lower part of the engine so as to suction the air flowing around the engine from above and discharge the air from below by matching a swirling direction of the flow of the air generated by the fan.

2. The construction machine according to claim 1, wherein the exhaust duct is provided over substantially a whole region of the engine in the fan axial direction, and the air inlet opening and the air outlet opening are formed over substantially a whole length of the exhaust duct in the fan axial direction.

3. The construction machine according to claim 1, wherein the construction machine includes: a frame including a part which configures a floor of the engine room; a partition member provided to stand up in a posture of extension substantially in parallel with a longitudinal direction of the engine on the frame to define the engine room at a rear part of the frame; and a duct body in a frame shape surrounding a space opened frontward, the duct body being attached to a rear-side surface of the partition member to form the exhaust duct in cooperation with the partition member.

4. The construction machine according to claim 1, further comprising an air guide member for collecting air having passed in the fan axial direction through a region in which the exhaust duct collects the air, at a downstream side of the region, and for guiding the air to the exhaust duct.

5. The construction machine according to claim 1, wherein the exhaust duct has a shape being bent between the air inlet opening and the air outlet opening.

6. The construction machine according to claim 5, wherein the exhaust duct is bent along a direction in which air swirls around the fan.

7. A construction machine comprising:
an engine room;
an engine housed in the engine room;
a heat exchanger provided at a first side as one side in a longitudinal direction of the engine;
an axial flow fan provided at the first side of the engine and adapted to be rotated to generate, around the engine, a flow of cooling air which enters the engine room from an outside of the engine room and passes through the heat exchanger, the flow containing respective direction components in a rotational direction, a centrifugal direction, and an axial direction, of the fan;
an exhaust duct having an air inlet opening and an air outlet opening and provided in the engine room so as to extend in a fan axial direction parallel with a rotation axis of the fan along the engine, the exhaust duct adapted to guide the flow of the air so as to collect the air, which flows at a downstream side of the fan in the fan axial direction, in a region extending in the fan axial direction and so as to discharge the air to an outside of the engine room;
an air guide member for collecting air having passed in the fan axial direction through a region in which the exhaust duct collects the air, at a downstream side of the region, and for guiding the air to the exhaust duct,
a hydraulic pump provided at a second side of the engine opposite to the first side; and
a pump cover for covering the hydraulic pump to shield at least a part of the hydraulic pump from the engine, the pump cover having an air inlet for taking in air flowing around the engine and an air outlet for discharging the taken-in air into the exhaust duct to function as the air guide member.

8. The construction machine according to claim 7, wherein the pump cover has a shape having an opening at a lower end and covering the hydraulic pump at an upper side thereof to discharge air flowing in through the opening to the exhaust duct.

* * * * *